United States Patent
Oh et al.

(10) Patent No.: US 8,013,705 B2
(45) Date of Patent: Sep. 6, 2011

(54) FIELD COIL ASSEMBLY OF ELECTROMAGNETIC CLUTCH FOR COMPRESSOR AND METHOD FOR MANUFACTURING THE SAME

(75) Inventors: Sung-Taeg Oh, Daejeon (KR); Tae-Young Park, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 0 days.

(21) Appl. No.: 12/435,837

(22) Filed: May 5, 2009

(65) Prior Publication Data
US 2009/0278640 A1 Nov. 12, 2009

(30) Foreign Application Priority Data
May 6, 2008 (KR) .................. 10-2008-0041959

(51) Int. Cl.
| H01F 27/04 | (2006.01) |
| H01F 27/02 | (2006.01) |
| H01F 17/00 | (2006.01) |
| H01F 27/29 | (2006.01) |
| H01F 5/00  | (2006.01) |
| F16D 19/00 | (2006.01) |

(52) U.S. Cl. .......... 336/107; 336/90; 336/105; 336/192; 335/299; 192/84.1

(58) Field of Classification Search .......... 335/296, 335/299; 192/84.1–84.31, 84.9, 84.96; 336/90, 336/96, 105, 107, 192; 439/95, 98, 101, 439/108, 386, 954

See application file for complete search history.

(56) References Cited

U.S. PATENT DOCUMENTS

| 3,360,754 | A | * | 12/1967 | Gerdiman | 336/170 |
| 3,537,677 | A | * | 11/1970 | Cotton et al. | 249/83 |
| 3,566,008 | A | * | 2/1971 | Ettlinger et al. | 174/94 R |
| 4,381,464 | A | * | 4/1983 | Schnyder | 310/45 |
| 5,015,948 | A | * | 5/1991 | Tew | 324/207.23 |
| 5,307,038 | A | * | 4/1994 | Ishimaru | 335/296 |
| 5,508,671 | A | * | 4/1996 | Takashi | 335/296 |
| 5,812,044 | A | * | 9/1998 | Sakamoto | 335/299 |
| 5,988,772 | A | * | 11/1999 | Hashida | 303/119.3 |
| 6,420,773 | B1 | * | 7/2002 | Liou | 257/531 |
| 6,867,675 | B2 | * | 3/2005 | Suda | 336/192 |
| 6,918,800 | B2 | * | 7/2005 | Ota et al. | 439/886 |

(Continued)

FOREIGN PATENT DOCUMENTS

CN 150015 A 5/2004

(Continued)

*Primary Examiner* — Anh T Mai
*Assistant Examiner* — Mohamad A Musleh
(74) *Attorney, Agent, or Firm* — Birch, Stewart, Kolasch & Birch, LLP

(57) ABSTRACT

A field coil assembly of an electromagnetic clutch for a compressor and a method for manufacturing the same, wherein the field coil assembly includes a coil installed in a core and made by winding a wire W and a connector coupled thereto. The connector is provided with a terminal which is electrically connected to one end of the wire W. A protective coating is formed at a connecting portion between the terminal and the end of the wire W to prevent the connecting portion of the wire W and the terminal from being exposed to the outside. Accordingly, the connecting portion between the terminal and the coil is not exposed to moisture or air, thereby preventing electric short circuit from occurring by galvanic corrosion between the terminal and the coil.

4 Claims, 7 Drawing Sheets

U.S. PATENT DOCUMENTS

| | | | |
|---|---|---|---|
| 7,138,895 B2 * | 11/2006 | Chung | 335/299 |
| 2006/0222868 A1 * | 10/2006 | Mori | 428/447 |
| 2009/0176102 A1 * | 7/2009 | Lin et al. | 428/413 |
| 2009/0189475 A1 * | 7/2009 | Shin | 310/195 |
| 2010/0253159 A1 * | 10/2010 | Shi et al. | 310/43 |

FOREIGN PATENT DOCUMENTS

| | | |
|---|---|---|
| JP | 2002340035 A * | 11/2002 |
| KR | 10-2006-0031527 A | 4/2006 |
| KR | 10-2007-0107467 A | 11/2007 |
| WO | WO 2004085866 A1 * | 10/2004 |

* cited by examiner

FIELD COIL ASSEMBLY OF ELECTROMAGNETIC CLUTCH FOR COMPRESSOR AND METHOD FOR MANUFACTURING THE SAME

BACKGROUND OF THE INVENTION

1. Field of the Invention

The present invention relates to an electromagnetic clutch for a compressor, and more particularly, to a field coil assembly provided in an electromagnetic clutch for a compressor and a method for manufacturing the same.

2. Description of the Related Art

Generally, an electromagnetic clutch for a compressor is an electric device that forms a magnetic field by electromagnetic induction of a wound coil when power is supplied thereto. The magnetic force formed by the electromagnetic clutch causes a disc of a driving shaft of a compressor to be attracted toward a frictional surface of a pulley and dynamically connected thereto, so that the driving force of the pulley rotated by an engine is transferred to the disc of the driving shaft of the compressor. Accordingly, the electromagnetic clutch manages the power of the compressor according to whether the electric power is applied to the coil, thereby controlling the operation of a cooling system of an air conditioner.

FIG. 1 is a perspective view showing a conventional field coil assembly of an electromagnetic clutch for a compressor, and FIG. 2 is a plan view showing a major portion of a connector employed in the conventional electromagnetic clutch for a compressor.

As shown in the figures, a electromagnetic clutch for a compressor includes a pulley (not shown) connected to a crank shaft of an engine through a driving belt (not shown) and having a frictional side surface, a field coil assembly 1 housed in the pulley and supported by a housing (not shown) of the compressor to generate a magnetic flux by the applied power, and a disc and hub assembly (not shown) for transferring the power of the engine to the driving shaft of the compressor by bring a disc (not shown) into close contact with the frictional surface of the pulley using the magnetic flux generated by the field coil assembly 1.

A coil is provided in a body 2 that defines a framework of the field coil assembly 1, wherein the coil has a ring shape formed by winding a wire. A connector 10 is coupled to one side of the body 2. The connector 10 receives power and then transfers the power into the body 2 through terminals 15 so that the field coil assembly 1 forms a magnetic field.

An external appearance and framework of the connector 10 is defined by a housing 11. The housing 11 is made of an insulating material such as synthetic resin. A coupler 13 is formed at one side of the housing 11 such that it is coupled with a counterpart, and the terminals 15 are provided at one end of the coupler 13 to partially protrude therefrom.

At this time, as seen from FIG. 2, electronic elements such as a diode D and a resistance R are mounted in the housing 11. The diode D and the resistance R form a surge absorbing circuit in the connector 10 and are electrically connected to the terminals 15.

A manufacturing process of the connector 10 will be described. The terminals 15 are firstly insert injection molded to be integrated with the housing 11. In other words, the housing 11 is molded with the terminals 15 inserted in a mold assembly so that the terminals 15 are manufactured to be fixed in the housing 11.

In this state, the diode D and the resistance R are inserted into the housing 11. At this time, the diode D and the resistance R are assembled to be connected to ends of the terminals 15, and thermosetting resin such as epoxy-based resin E is injected into the housing 11 to fix the diode D and the resistance R.

Then, a wire W extending from the inside of the body 2 is connected to the connector 10. More specifically, in a state where one end of the wire W is inserted into a coupler 15' formed at one end of the terminal 15, the coupler 15' is tightened to fix the end of the wire W to the coupler 15'.

At this time, ends of the wire W, which extend from a coil (not shown) provided in the body 2, may be considered as parts of the coil.

A cover C may be provided in connecting portions between the wire W and the terminals 15. The cover C protects the connecting portions between the wire W and the terminals 15 from the outside and is configured as a separate part to thereby shield the connecting portions between the wire W and the terminals 15.

Accordingly, the terminals 15 are electrically connected to the ends of the wire W, so that the power transmitted through the connector 10 may be transferred to the coil through the ends of the wire W.

Recently, the present applicant has developed a technique to make the wire W of aluminum. In other words, the wire W may not be made of a copper material identical to the terminal 15 but an aluminum material that is lighter and relatively inexpensive.

However, the prior art discussed above has the following problems.

If the material of the wire W is different from that of the terminal 15, corrosion caused by contact between different kinds of metals, i.e., galvanic corrosion, may occur between the terminal 15 and the wire W. The galvanic corrosion is caused by a difference of potentials between two different kinds of metals exposed to the air, and the galvanic corrosion becomes more serious if the difference of potentials is greater or the metals are exposed to moisture.

At this time, copper and aluminum exhibits a great difference in their activations, and the field coil assembly is used in a vehicle where oxygen is easily supplied and temperature and humidity are relatively high. Thus, there is a problem in that galvanic corrosion may easily occur between the terminal 15 and the wire W.

In order to solve this problem, the connecting portions between the terminals 15 and the wire W may be shielded using a separate cover C as mentioned above. However, the cover C is a separate part, and moisture may penetrate through a gap between the cover C and the connector 10 to thereby cause corrosion between the terminal 15 and the wire W.

Also, this galvanic corrosion may result in electric short circuit between the terminal 15 and the wire W, which deteriorates reliability in operation of the electromagnetic clutch for a compressor.

SUMMARY OF THE INVENTION

The present invention is conceived to solve the aforementioned problems in the prior art. An object of the present invention is to provide a field coil assembly having a protective coating portion between a terminal provided at a connector and an end of a wire of a coil connected to the terminal.

According to an aspect of the present invention for achieving the object, there is provided a field coil assembly of an electromagnetic clutch for a compressor, which receives power from the outside through a connector provided at one side. The field coil assembly includes a coil installed to a core and made by winding a wire to generate a magnetic flux, and a connector provided at one side of the core and having a terminal provided therein thereby being electrically connected to one end of the wire, wherein a protective coating portion is formed at a connecting portion between the terminal and the wire to prevent the connecting portion from being exposed to the outside.

The protective coating portion may be formed by applying a UV-curing paint or an epoxy-based resin paint.

The wire may be made of aluminum, and the terminal may be made of copper or its alloy.

A shielding portion may be formed at one side of the connector corresponding to the connecting portion of the terminal and the end of the wire.

According to another aspect of the present invention, there is provided a method for manufacturing a field coil assembly of an electromagnetic clutch for a compressor, wherein the field coil assembly receives power from the outside through a connector provided at one side thereof. The method includes the steps of making a connector having a terminal provided therein by insert injection molding, connecting a wire to the terminal, forming a protective coating portion at a connecting portion between the terminal and one end of the wire, and molding a resin material with the connector and the coil coupled with each other, thereby forming a shielding portion.

The step of forming the protective coating portion may be performed by applying a UV-curing paint and irradiating it with UV light.

The step of forming the protective coating portion may be performed by applying an epoxy-based resin paint.

BRIEF DESCRIPTION OF THE DRAWINGS

The features and advantages of the present invention will become apparent from the following details in conjunction with the accompanying drawings, in which.

DESCRIPTION OF THE PREFERRED EMBODIMENT

Hereinafter, preferred embodiments of a field coil assembly of an electromagnetic clutch for a compressor and a method for manufacturing the same according to the present invention will be described in detail with reference to the accompanying drawings.

Figure 1:
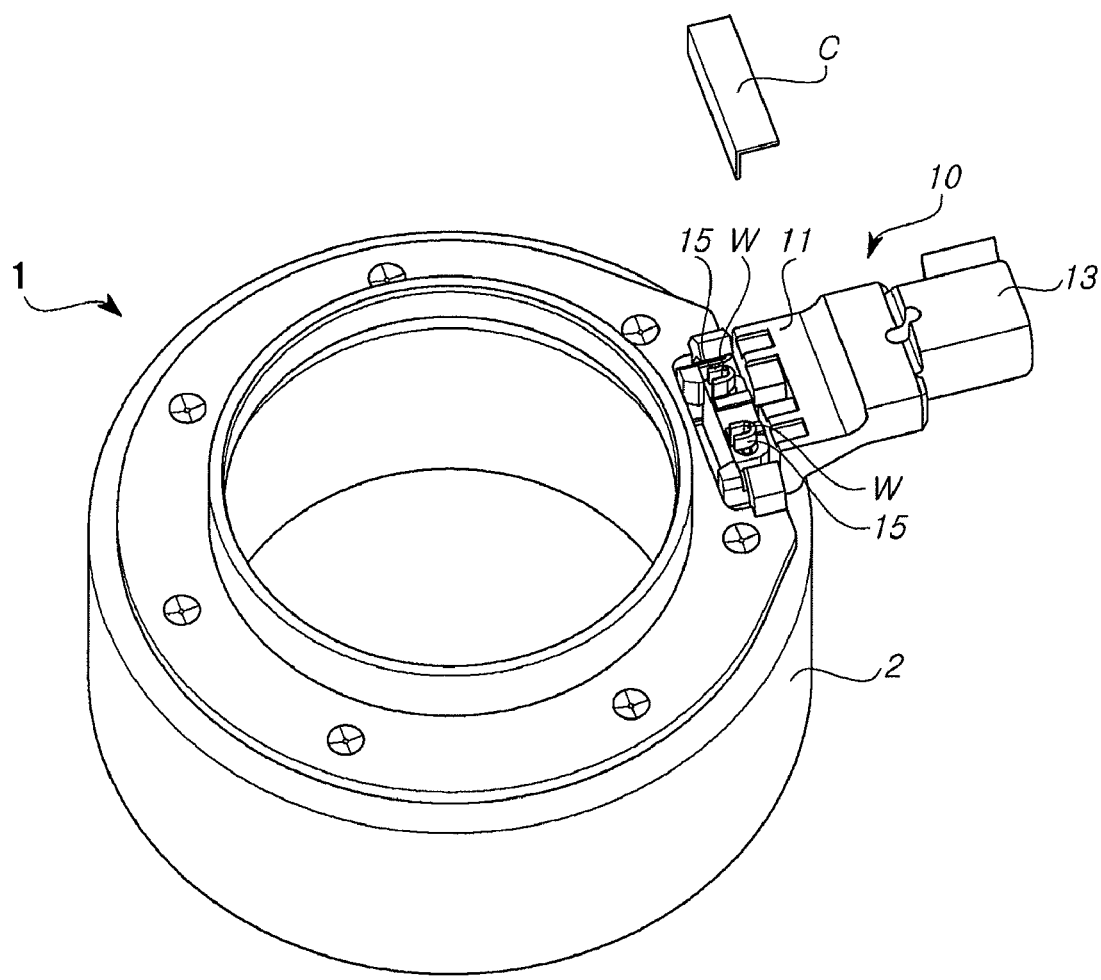
FIG. 1 is a perspective view showing a conventional field coil assembly of an electromagnetic clutch for a compressor.
Figure 2:
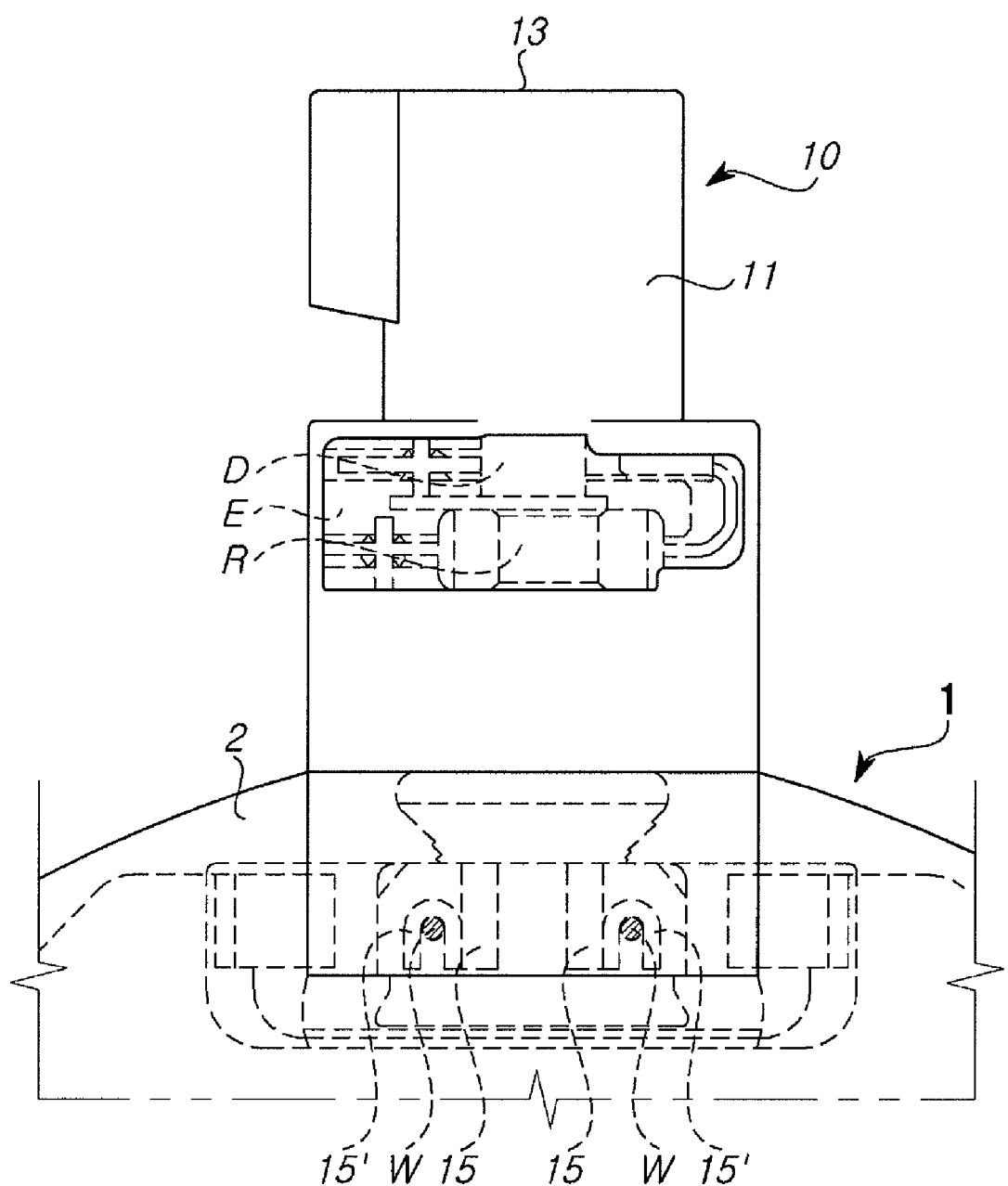
FIG. 2 is a plan view showing a connector employed in the conventional field coil assembly.
Figure 3:
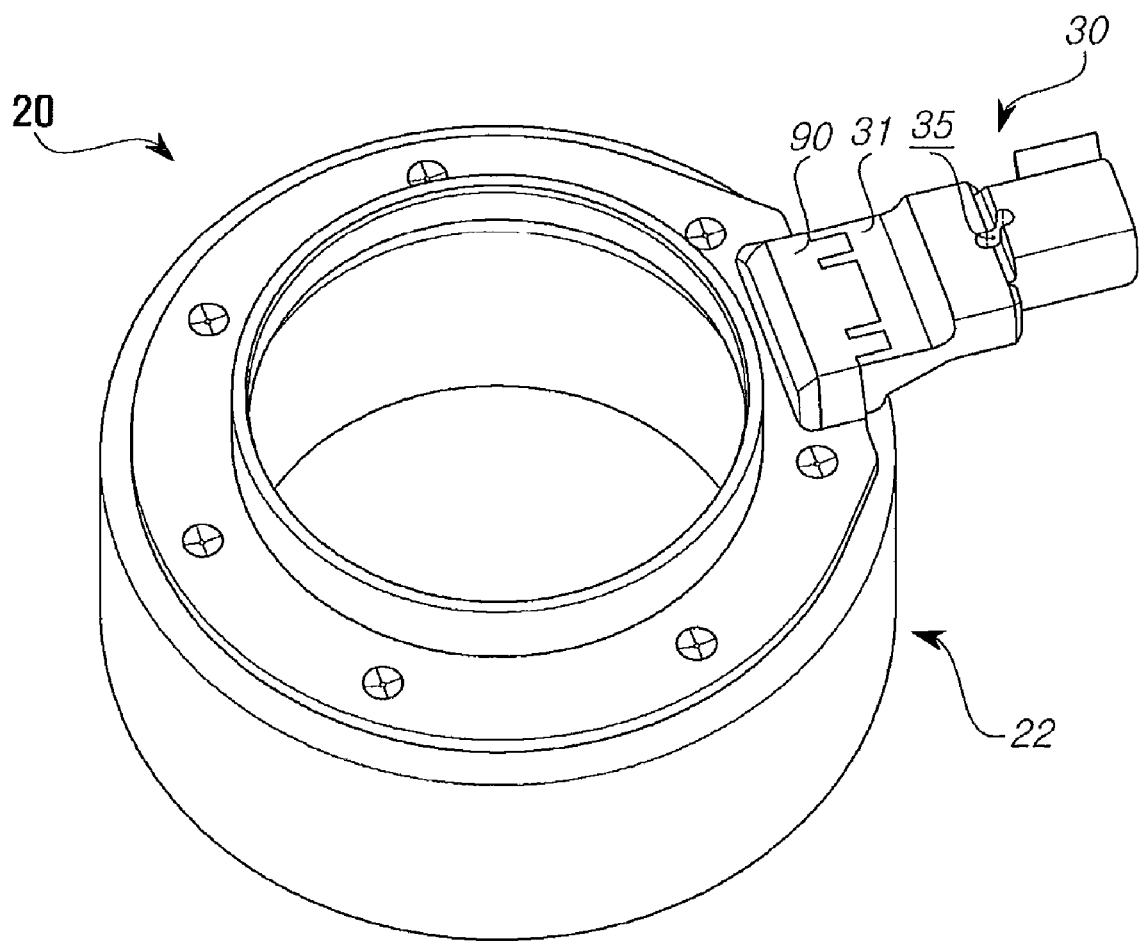
FIG. 3 is a perspective view showing a preferred embodiment of a field coil assembly of an electromagnetic clutch for a compressor according to the present invention.
Figure 4:
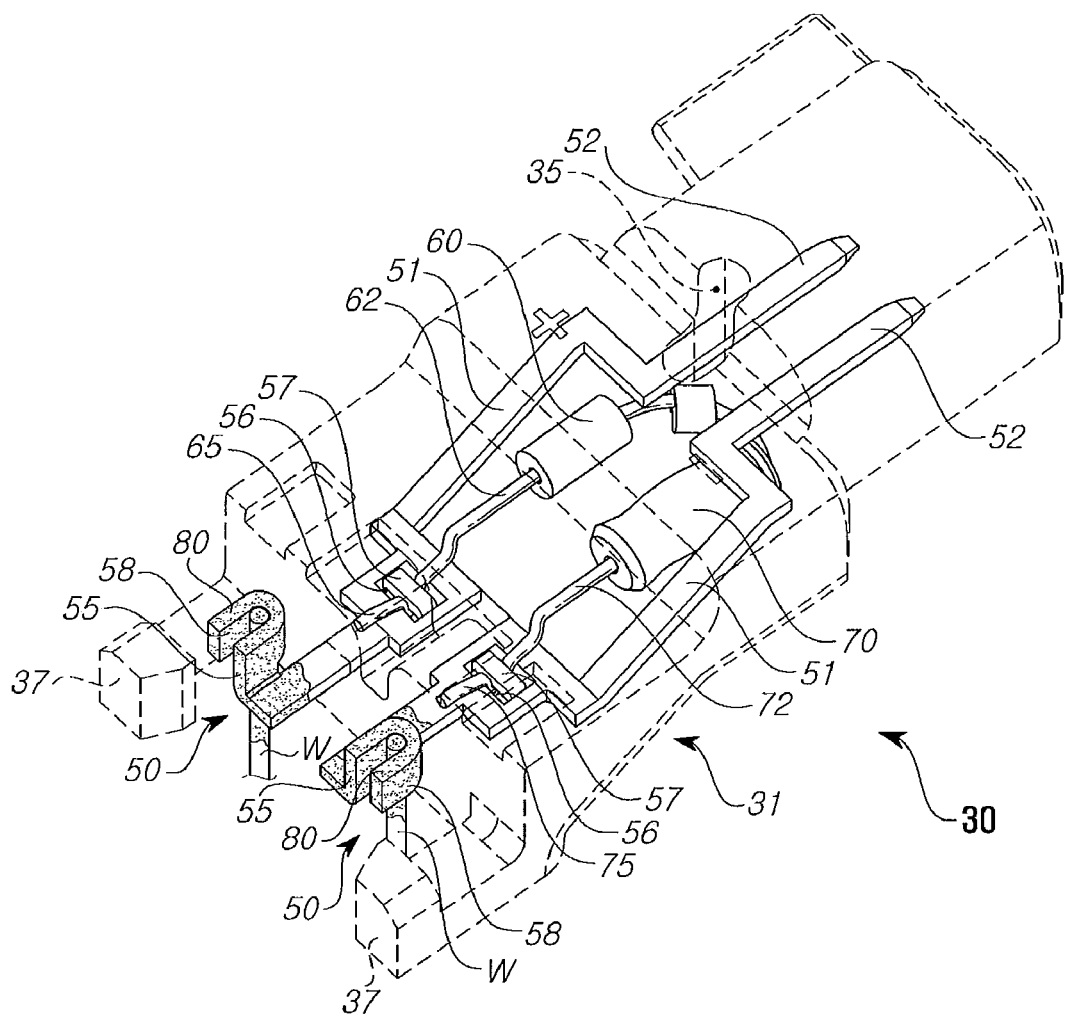
FIG. 4 is a perspective view showing a connector and a wire of a coil connected thereto employed in the field coil assembly according to the present invention.
Figure 5:
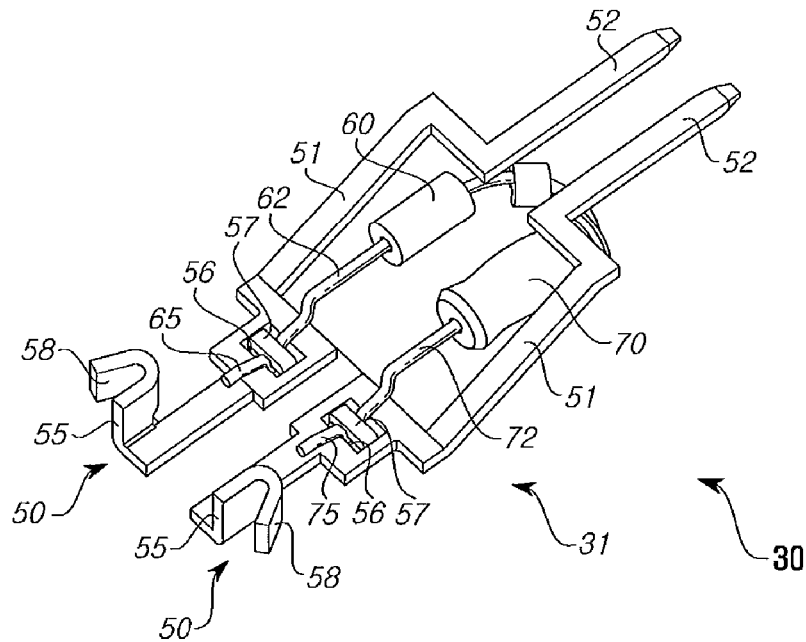
FIGS. 5 to 8 are views subsequently illustrating a process of manufacturing a field coil assembly of an electromagnetic clutch for a compressor according one embodiment of the present invention.
Figure 6:
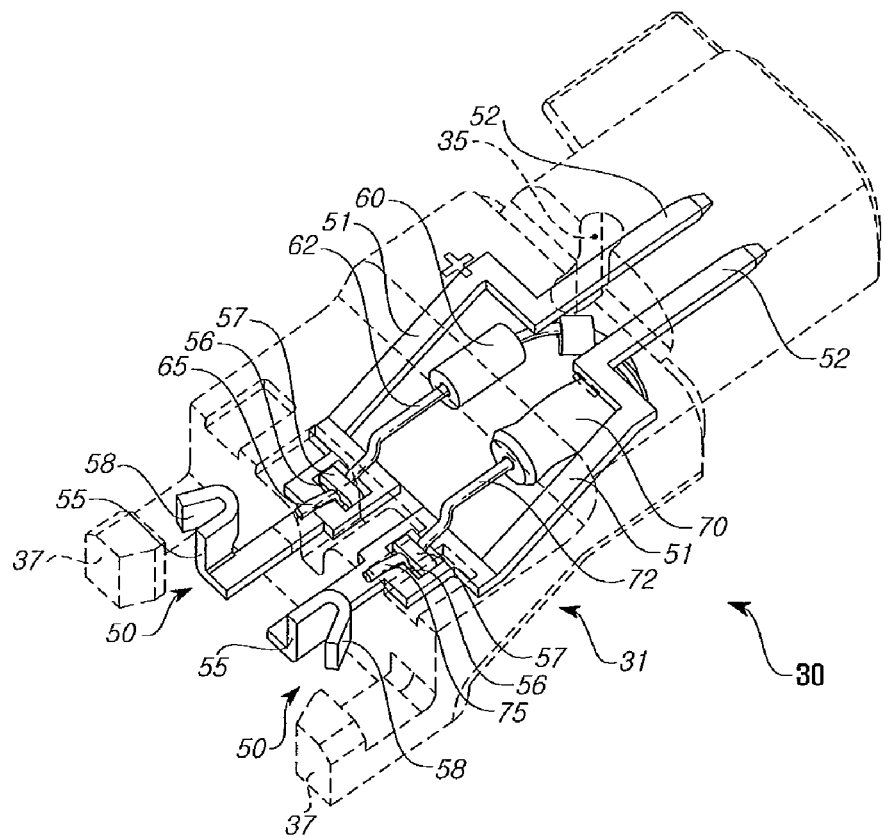
Figure 7:
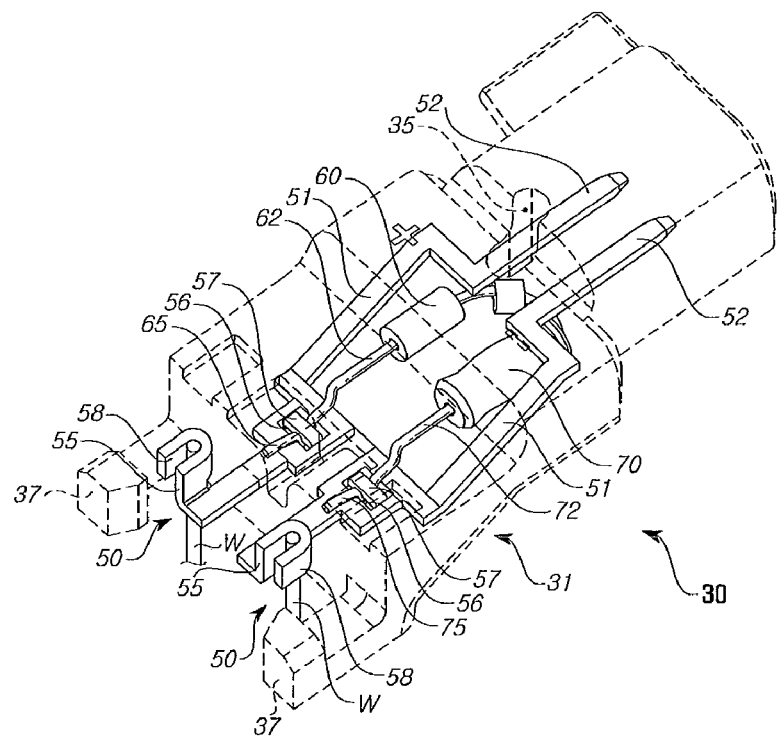
Figure 8:
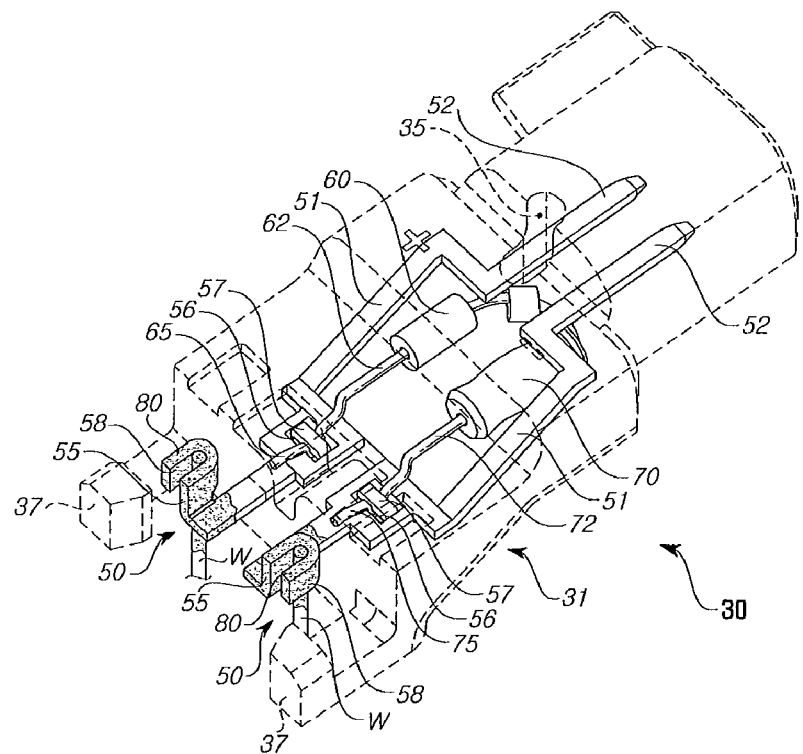

FIG. 3 is a perspective view showing a preferred embodiment of a field coil assembly of an electromagnetic clutch for a compressor according to the present invention, FIG. 4 is a perspective view showing a connector and a wire of a coil connected thereto employed in the field coil assembly according to the present invention.

As shown in the figures, a bobbin (not shown) is installed to a core 22 that defines an external appearance and framework of the field coil assembly of an electromagnetic clutch for a compressor, and a coil (not shown) is provided in the bobbin. Also, a fixing cover (not shown) is coupled to the bobbin with the coil interposed therebetween to support the coil.

The coil is configured by winding a wire W and has a substantial ring shape. Two pieces of the wire W with different polarities are respectively drawn from one side of the coil. One end of the drawn wire W is connected to a terminal 50, which will be described later. In this embodiment, the wire W is made of an aluminum material.

A connector 30 is provided at one side of the core 22. The connector 30 is a kind of electric connector and serves to transfer external power to the coil in connection with a counterpart connector (not shown). As seen from FIG. 4, an external appearance and framework of the connector 30 is defined by a housing 31. The housing 31 is made of an insulating material such as synthetic resin and formed by injection molding.

An injection groove 35 is concavely formed on an outer surface of the housing 31. The injection groove 35 is to prevent electronic elements 60 and 70, which will be described later, from freely moving while being assembled in the housing 31 during an injection molding process. More specifically, an injection mold is provided with a core (not shown) for forming the injection groove 35, so that the electronic elements 60 and 70 may be fixed at their locations by the core.

At this time, although only one injection groove 35 is shown in FIG. 4, the number thereof is not limited thereto, but several injection grooves may be formed on upper and lower surfaces of the housing 31.

Fixing projections 37 are provided on one side of the housing 31. The fixing projections 37 are to fix the connector 30 to the core 22 of a field coil assembly 20. For this purpose, the fixing projections 37 are provided in a pair at a rear end of the housing 31 as shown in the figure.

As seen from FIG. 4, terminals 50 are provided in the housing 31. The terminals 50 are to transfer external power to the coil wound in the field coil assembly 20 and made of a metal material with good electric conductivity. The terminals 50 are provided in a pair in the housing 31. In this embodiment, the terminal 50 is made of copper or alloy thereof such as brass.

A bar-shaped body 51 defines a framework of the terminal 50 and has both ends 52 and 55 respectively connected to one end of the wire W of the coil and a counterpart connector (not shown).

At this time, a coupling slot 56 is formed in the body 51 of the terminal 50. The coupling slot 56 is formed by cutting a part of the body 51, and lead wires 62 and 72 of the electronic elements 60 and 70, which will be described later, are coupled to the coupling slot 56. In this embodiment, the coupling slot 56 is formed through a part of the body 51, but the present invention is not limited thereto. In other words, the coupling slot 56 may be formed to communicate with the outside in such a manner that a part of the body 51 corresponding to one side of the coupling slot 56 is cut away.

A slot bridge 57 is provided at one side of the coupling slot 56. The slot bridge 57 is formed during the cutting process for the coupling slot 56, and the slot bridge 57 is provided across the coupling slot 56. In other words, predetermined spaces allowing the lead wire 62 or 72 of the electronic elements 60 and 70 to pass therethrough are formed between the coupling slot 56 and the slot bridge 57.

A coupling portion 58 is provided at one end of each terminal 50. The coupling portion 58 is used for electric connection with the wire W and is formed with a predetermined space to allow the end of the wire W to be inserted therein. In other words, as the coupling portion 58 is tightened with the end of the wire W inserted in the coupling portion 58, the wire W is fixed to the terminal 50.

The electronic elements 60 and 70 are electrically connected to the terminals 50. The electronic elements 60 and 70 are to form a surge absorption circuit at the connector 30 and are composed of a discharging element 60 and a residual magnetic field removing element 70. In this embodiment, the discharging element 60 and the residual magnetic field removing element 70 are respectively configured as a diode and a resistance, but not limited thereto. Alternatively, the surge absorption circuit may be configured only as a diode 60. The diode 60 and the resistance 70 are electrically connected to the terminals 50 which are provided in a pair.

The diode 60 and resistance 70 are provided with lead wires 62 and 72, respectively. The lead wires 62 and 72, which are to electrically connect to the terminals 50, are formed to extend toward the terminals. More specifically, ends 65 and 75 of the lead wires 62 and 72 are respectively fixed to the coupling slots 56 by means of the slot bridges 57 of the terminals 50, thereby electrically connecting the diode 60 and the resistance 70 to the terminals 50.

A protective coating portion 80 is formed at a portion where the coupling portion 58 of the terminal 50 is coupled with the wire W. The protective coating portion 80 is a kind of film wrapping the wire W and the coupling portion 58 of each terminal 50 and prevents a connecting portion between the terminal 50 and the wire W from being exposed to moisture or air.

Preferably, the protective coating portion 80 is formed by applying a UV-curing paint. The UV-curing paint is paint which is cured within a very short time if exposed to UV light of a certain wavelength to form a coating film. The UV-curing paint allows fast coating and ensures excellent corrosion resistance, insulating property and heat resistance.

The protective coating portion 80 may also be formed using various hot-melt resins such as silicone and epoxy-based resin paint, instead of application of a UV-curing paint.

<Experimental data of inventive field coil assembly>

|  | Conventional field coil assembly | Inventive field coil assembly |
| --- | --- | --- |
| 1 | 20 mA | 1 mA or less |
| 2 | 30 mA | 1 mA or less |
| 3 | 10 mA | 1 mA or less |
| 4 | 40 mA | 1 mA or less |
| 5 | 50 mA | 1 mA or less |
| Average | 30 mA | 1 mA or less |

The above table shows the experimental results for anti-corrosion effects by the protective coating portion 80. In this experiment, the field coil assembly according to the embodiment of the present invention was dipped in water for 48 hours and then its leakage current was measured, and then the measured value was compared with that of a conventional field coil assembly. As the field coil assembly has more excellent waterproof and insulating properties, the leakage current value becomes smaller. Thus, the effect of the protective coating portion 80 may be estimated. This experiment was conducted five times in total.

From the above results, it would be understood that the leakage current of the field coil assembly of this embodiment is just 1/30 in average of that of the conventional field coil assembly that is not provided with the protective coating portion 80. It means that the waterproof and insulating properties of the field coil assembly of this embodiment are greatly improved as compared with the field coil assembly that is not provided with the protective coating portion 80. In other words, the connecting portion between the wire W and the terminal 50 is more securely protected by the protective coating portion 80.

As seen from FIG. 3, a shielding portion 90 is formed at one side of the housing 31 corresponding to the connecting portion between each terminal 50 and the wire W. After the terminals 50 are coupled with the wire W and then the protective coating portions 80 are formed therebetween, the shielding portion 90 is formed by injection molding, thereby shielding the exposed connecting portions between the terminals 50 and the wire W. The connecting portions between the terminals 50 and the wire W are doubly insulated by the shielding portion 90 together with the protective coating portions 80 and are more securely prevented from being exposed to moisture or air.

Hereinafter, a method for manufacturing a field coil assembly of an electromagnetic clutch for a compressor according to the present invention will be described.

Figure 9:
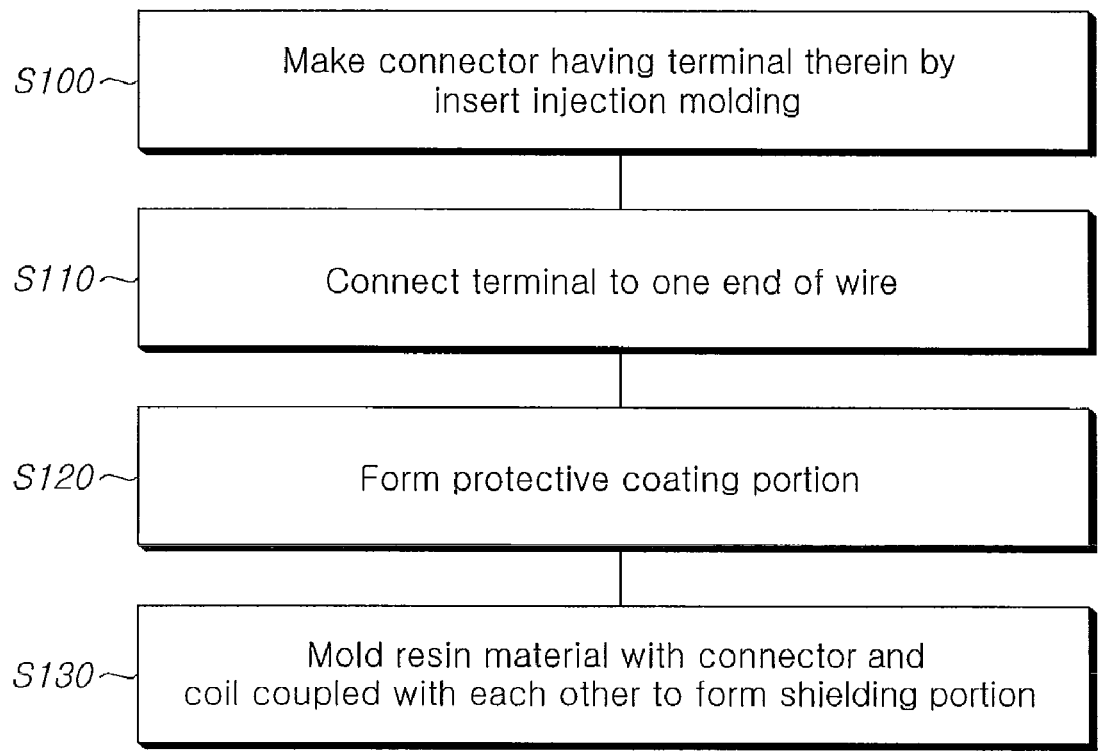
FIG. 9 is a flowchart illustrating the process of manufacturing a field coil assembly of an electromagnetic clutch for a compressor according the embodiment of the present invention.

FIGS. 5 to 8 are views subsequently illustrating a process of manufacturing a field coil assembly of an electromagnetic clutch for a compressor according one embodiment of the present invention, and FIG. 9 is a flowchart illustrating the process of manufacturing a field coil assembly of an electromagnetic clutch for a compressor according the embodiment of the present invention.

According to the figures, the terminals 50 and the electronic elements 60 and 70 forming a surge absorption circuit are assembled before injection molding the housing 31. More specifically, the lead wires 62 and 72 of the diode 60 and resistance 70 are respectively aligned to the coupling slots 56 of the terminals 50. At this time, in a case where a plurality of coupling slots 56 are formed, each lead wire 62 or 72 is arranged to cross the plurality of coupling slots 56.

In this state, the slot bridge 57 of the terminal 50 is pressed toward the lead wire 62 or 72 and plastically deformed. At this time, the slot bridge 57 may be deformed using a press die. If the slot bridge 57 is pressed and plastically deformed as mentioned above, the lead wire 62 or 72 is compressed between the slot bridge 57 and the coupling slot 56 and thus firmly fixed thereto. This state is well shown in FIG. 5.

Then, if the assembly of the diode 60 and resistance 70 and the terminals 50 is located in an injection mold, the housing 31 is made by insert injection molding (S100).

More specifically, in a state where the assembly of the terminals 50 and the electronic elements 60 and 70 forming a surge absorption circuit is located in a cavity of a mold assembly for molding the housing 31, a melt resin is injected thereinto to manufacturing the connector 30. This state is well shown in FIG. 6.

The connector 30 manufactured in this manner is connected to the coil provided in the core 22 of the field coil assembly 20 (S110).

In other words, the coupling portion 58 of the terminal is connected to the drawn end of the wire W of the coil. At this time, in a state where the end of each wire W is inserted in the coupling portion 58 of the terminal 50, the coupling portion 58 is plastically deformed to firmly connect the wire W to the terminal 50. This state is well shown in FIG. 7.

Thereafter, a UV-curing paint is applied to the connecting portions between the terminals 50 and the wire W. Then, if the portion coated with the UV-curing paint is irradiated with UV light, the UV-curing paint is cured (S120). At this time, since the UV-curing paint is cured within a relatively shorter time, the working time can be shortened. In this way, the protective coating portion 80 is formed on the connecting portions between the terminals 50 and the wire W. This state is well shown in FIG. 8.

Accordingly, the connecting portions between the terminals 50 and the wire W are wrapped by the protective coating portion 80, respectively, thereby preventing permeation of moisture into the connecting portions and exposure of them to the external air. Thus, although the wire W and the terminal 50 are made of different kinds of materials, galvanic corrosion can be prevented from occurring therebetween.

Finally, if the insert injection molding is performed with the connector 30 connected to the coil, the shielding portion 90 (see FIG. 3) is formed at one side of the connector 30 (S130). The shielding portion 90 is formed at a portion where the terminals 50 of the connector 30 are connected with the wire W of the coil and thus serves to doubly protect the connecting portions between the terminals 50 and the wire W together with the protective coating portion 80.

The field coil assembly 20 assembled as mentioned above is supplied with external power through the connector 30. In other words, the terminals 50 of the connector 30 are electrically connected to terminals of a counterpart connector, and at the same time the terminals 50 are connected to the wire W, so that external power may be transmitted to the coil.

At this time, although the wire W and the terminals 50 are made of different kinds of materials, i.e., aluminum and copper, galvanic corrosion is prevented from occurring between the wire W and the terminals 50 since the protective coating portions 80 are formed at the connecting portions between the wire W and the terminals 50. The shielding portion 90 also prevents moisture from penetrating into the connecting portions between the terminals 50 and the wire W.

In addition, as external power is supplied to the coil, the coil made by winding the wire W forms a magnetic field by magnetic induction, and a disc at a driving side of a compressor is attracted toward a frictional surface of a pulley using the electromagnetic force and thus dynamically connected thereto. In this state, the driving force of the pulley rotated by an engine is transmitted to the compressor, whereby the compressor operates.

Although in the two aforementioned embodiments, two kinds of connectors 30 are described as examples, the present invention is not limited thereto. That is, various types of connectors 30 connected to the coil of the field coil assembly 20 may be employed.

The scope of the present invention is not limited to the embodiment described above but is defined by the appended claims. It will be apparent that those skilled in the art can make various modifications and changes thereto within the scope of the invention defined by the claims.

In the present invention, the protective coating portions are formed at the connecting portions between the coil and the terminals of the connector employed in the field coil assembly. Accordingly, the connecting portions between the terminals and the coil are not exposed to moisture or air, thereby preventing galvanic corrosion from occurring between the terminals and the coil. As a result, the field coil assembly may exhibit improved operational reliability and durability.

In addition, according to the present invention, the shielding portion is provided in the connector to thereby shield the connecting portions between the terminals and the coil doubly together with the protective coating portions, so that the operational reliability and durability of the field coil assembly can be more securely ensured.

Further, according to the present invention, a process of forming the protective coating portion is added to an existing method for manufacturing a connector of a field coil assembly. Thus, the existing manufacturing processes can be utilized as they were, thereby making it possible to protect the connecting portions between the terminals and the coil without adding production costs.

What is claimed is:

1. A field coil assembly of an electromagnetic clutch for a compressor for a vehicle, comprising:
   an aluminum coil installed to a core and made by winding a wire to generate a magnetic flux;
   a connector provided in one side of the core and having a terminal electrically connected to one end of the wire to receive power and made of a conductive metal other than aluminum; and
   a protective coating portion formed at a connecting portion between the terminal and the end of the wire, thereby preventing the connecting portion from being exposed to the outside,
   wherein the protective coating portion is formed by applying a UV-curing paint or an epoxy-based resin paint,
   wherein the terminal is made of copper or its alloy, and
   wherein a shielding portion is formed at one side of the connector.

2. The field coil assembly as claimed in claim 1, wherein the side of the connector at which the shielding portion is formed corresponds to the connecting portion of the terminal and the end of the wire.

3. The field coil assembly as claimed in claim 1,
   wherein the connector provided with the terminal therein is made by insert injection molding;
   wherein a corrosion resistant protective coating portion is formed at the connecting portion between the terminal and the end of the wire to be the protective coating portion; and
   wherein the shielding portion is formed by molding a resin material with the connector and the coil coupled to each other.

4. The field coil assembly as claimed in claim 3, wherein the UV-curing paint is irradiated with UV light.

* * * * *